(12) United States Patent
Rao et al.

(10) Patent No.: US 12,228,439 B2
(45) Date of Patent: Feb. 18, 2025

(54) TO REDUCE STRAIN IN CORIOLIS FLOW SENSOR

(71) Applicant: MICRO MOTION, INC., Boulder, CO (US)

(72) Inventors: Praveen Rao, Thornton, CO (US); Martin Andrew Schlosser, Boulder, CO (US)

(73) Assignee: MICRO MOTION, INC., Boulder, CO (US)

( * ) Notice: Subject to any disclaimer, the term of this patent is extended or adjusted under 35 U.S.C. 154(b) by 28 days.

(21) Appl. No.: 17/782,825

(22) PCT Filed: Dec. 13, 2019

(86) PCT No.: PCT/US2019/066204
§ 371 (c)(1),
(2) Date: Jun. 6, 2022

(87) PCT Pub. No.: WO2021/118594
PCT Pub. Date: Jun. 17, 2021

(65) Prior Publication Data
US 2023/0003566 A1    Jan. 5, 2023

(51) Int. Cl.
*G01F 1/84* (2006.01)
(52) U.S. Cl.
CPC .......... *G01F 1/8418* (2013.01); *G01F 1/8404* (2013.01)

(58) Field of Classification Search
CPC .... G01F 1/8404; G01F 1/8409; G01F 1/8413; G01F 1/8418
See application file for complete search history.

(56) References Cited

U.S. PATENT DOCUMENTS

| | | | |
|---|---|---|---|
| 6,354,154 B1 * | 3/2002 | Van Cleve | ............ G01F 1/8418 73/861.357 |
| 6,487,917 B1 * | 12/2002 | Van Cleve | .............. G01F 1/849 73/861.357 |
| 2001/0039841 A1 | 11/2001 | Van Cleve et al. | |
| 2002/0139199 A1 | 10/2002 | Lanham et al. | |

FOREIGN PATENT DOCUMENTS

| | | |
|---|---|---|
| EP | 3208575 A1 | 8/2017 |
| WO | 0184085 A2 | 11/2001 |

* cited by examiner

*Primary Examiner* — Erika J. Villaluna
(74) *Attorney, Agent, or Firm* — The Ollila Law Group LLC

(57) ABSTRACT

An embodiment of a balance bar (230) is disclosed. The balance bar (230) comprises a first side portion (231) having a hollow interior for receiving a flow tube (220), a central portion (233) having a hollow interior for receiving a flow tube (220), and a first side flexible portion (234) comprising at least one flexible coupler (250), the first side flexible portion (234) coupling the first side portion (231) with the central portion (233), wherein the first side portion (231) and the central portion (233) are both more rigid than the first side flexible portion (234).

20 Claims, 9 Drawing Sheets

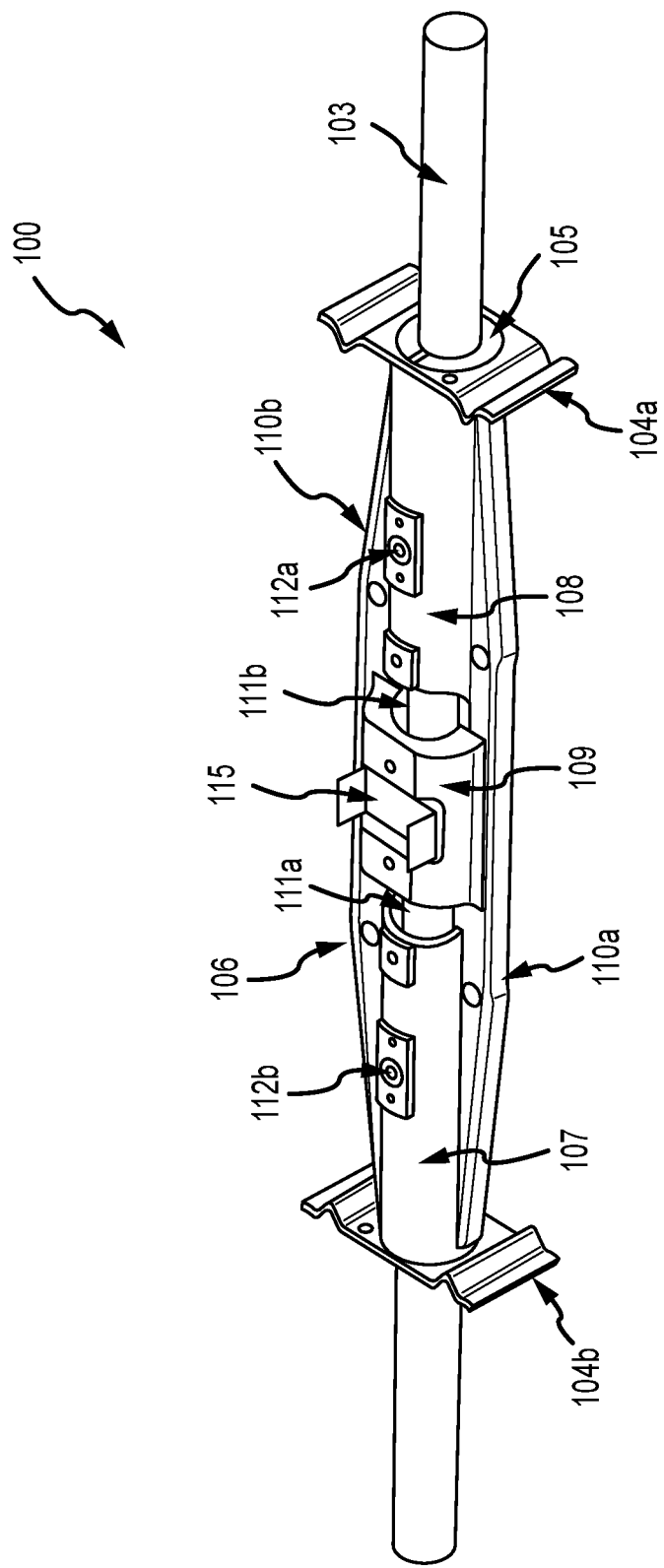
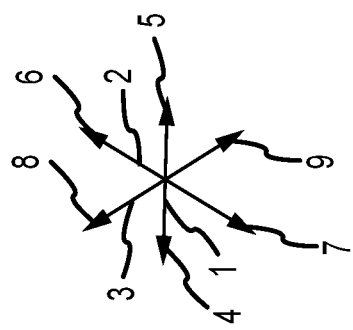
FIG. 1
(PRIOR ART)

TO REDUCE STRAIN IN CORIOLIS FLOW SENSOR

TECHNICAL FIELD

The embodiments described below relate to structural elements of a flow sensor, more particularly, to configurations of structural elements of a flow sensor.

BACKGROUND

Coriolis flowmeters provide excellent flow measurements for most systems. A typical issue with Coriolis flow sensors is that they have internal components with different properties that respond differently to different conditions. For instance, when elements of the Coriolis flow sensor change temperature, each element may expand or contract at its own rate, causing significant stress on the couplings between the elements.

In a Coriolis sensor, when a fluid with a temperature that is different from the interior temperature of the sensor is introduced to the sensor flow tube, the temperature of the flow tube is changed by conductive and/or convective heat transfer from the fluid. The other elements, for instance, a balance bar or case, of the sensor are not in direct contact with the flow fluid, so they are less affected by the changed temperature. For instance, in an embodiment in which the flow tubes are composed of material that expand when heated, when the flow fluid is hotter than the components in the sensor, the flow tube will expand to a greater degree than other components in the flow sensor, and when the flow fluid is cooler than the components in the sensor, the flow tube will contract to a greater degree than the other components in the sensor. In sensor arrangements that have flow tubes composed of polymers, the polymeric flow tubes may contract with increases in temperature and expand with decreases in temperature. In these systems, the polymeric flow tubes may expand as other components contract and contract as other components expand. The difference in material expansion and/or contraction causes significant stress on the flow tube and flow tube couplings that couple the flow tube to other components.

In some Coriolis flow sensors, the flow tubes are held in place by couplings to balance bars, perhaps via brace bars. In situations where the flow fluid temperature is different from the temperature of the balance bars, the flow tube will naturally expand or contract to a greater degree than the balance bars coupled to the flow tube. This causes stress on the flow tube itself, couplings to the flow tubes, and other flow sensor elements to which the flow tube and balance bars are coupled. These stresses can be especially high for sensor elements composed of common sensor element materials, for instance, alloy C22 (an alloy of nickel, chromium, molybdenum, and tungsten) and stainless steel. The stresses may be significant in vibratory sensors to the extent that the stresses may cause the sensors to yield, buckle, and/or fail.

Accordingly, there is a need for sensor component designs that reduce stress caused by temperature variations.

SUMMARY

An embodiment of a balance bar (230) is disclosed. The balance bar (230) comprises a first side portion (231) having a hollow interior for receiving a flow tube (220), a central portion (233) having a hollow interior for receiving a flow tube (220), and a first side flexible portion (234) comprising at least one flexible coupler (250), the first side flexible portion (234) coupling the first side portion (231) with the central portion (233), wherein the first side portion (231) and the central portion (233) are both more rigid than the first side flexible portion (234).

An embodiment of a method of making a balance bar (230) is disclosed. The method comprises forming the balance bar (230), the balance bar (230) comprising a first side portion (231) having a hollow interior for receiving a flow tube (220), a central portion (233) having a hollow interior for receiving a flow tube (220), a first side flexible portion (234) comprising at least one flexible coupler (250), the first side flexible portion (234) coupling the first side portion (231) with the central portion (233), wherein the first side portion (231) and the central portion (233) are both more rigid than the first side flexible portion (234).

ASPECTS

According to an aspect, a balance bar (230) is disclosed. The balance bar (230) comprises a first side portion (231) having a hollow interior for receiving a flow tube (220), a central portion (233) having a hollow interior for receiving a flow tube (220), and a first side flexible portion (234) comprising at least one flexible coupler (250), the first side flexible portion (234) coupling the first side portion (231) with the central portion (233), wherein the first side portion (231) and the central portion (233) are both more rigid than the first side flexible portion (234).

Preferably, the balance bar (230) further comprises two or more first side ribs (236a, 236b), wherein the two or more first side ribs (236a, 236b) are coupled to the exterior of the first side portion (231) and two or more central side ribs (236e, 236f), wherein the two or more central side ribs (236e, 236f) are coupled to the exterior of the central portion (233).

Preferably, one or more of the at least one flexible coupler (250) one or more of couples at least one of the two or more first side ribs (236a, 236b) to at least one of the two or more central side ribs (236e, 236f) and couples at least part of the central portion (233) and at least part of the first side portion (231).

Preferably, one or more of the first side portion (231) and the central portion (233) are only coupled by one or more of the at least one flexible coupler (250) and wherein any of the two or more first side ribs (236a, 236b) and any of the two or more central side ribs (236e, 236f) are only coupled by one or more of the at least one flexible coupler (250).

Preferably, at least one of the at least one flexible coupler (250) is arch shaped.

Preferably, at least one of the at least one flexible coupler (250) is skewed.

Preferably, the at least one of the at least one flexible coupler (250) is skewed towards the central portion (233) relative to the first side portion (231) in one or more of weight, cross-section, and thickness of the at least one of the at least one flexible coupler (250).

Preferably, at least one of the at least one flexible coupler (250) is symmetrical.

Preferably, the at least one flexible coupler (250) has an apex (251).

Preferably, the balance bar (230) further comprises at least one support (260), wherein one of the at least one support (260) at least partially couples one of the two or more first side ribs (236a, 236b) to another of the two or more first side ribs (236a, 236b).

Preferably, the balance bar (230) further comprises a second side portion (232) having a hollow interior for receiving a flow tube (220), a second side flexible portion (235) comprising another at least one flexible coupler (250), the second side flexible portion (235) coupling the second side portion (232) with the central portion (233), and two or more second side ribs (236c, 236d), wherein the two or more second side ribs (236c, 236d) are coupled to the exterior of the second side portion (232), wherein the second side portion (232) is more rigid than the first side flexible portion (234), wherein one or more of the another at least one flexible coupler (250) one or more of couples at least one of the two or more second side ribs (236c, 236d) to at least one of the two or more central side ribs (236e, 236f) and couples at least part of the central portion (233) and at least part of the second side portion (232) wherein one or more of the second side portion (232) and the central portion (233) are only coupled by one or more of the another at least one flexible coupler (250) and any of the two or more second side ribs (236c, 236d) and any of the two or more central side ribs (236e, 236f) are only coupled by one or more of the another at least one flexible coupler (250).

Preferably, all of at least two of the two or more first side ribs (236a, 236b), at least two of the two or more central side ribs (236e, 236f), and at least two of the two or more second side ribs (236c, 236d) are substantially coplanar.

Preferably, all of two or more of the at least one flexible coupler (250) and two or more of the another at least one flexible coupler (250) are substantially coplanar.

Preferably, the at least one flexible coupler (250) comprises four flexible couplers (250), wherein a first two of the four flexible couplers (250) couple the first side portion (231) to the central portion (233), the first two of the four flexible couplers (250) coupled to substantially radially symmetrical positions on the first side portion (231) and the central portion (233) about a central flow axis (299), wherein a second two of the four flexible couplers (250) couple the first side ribs (236a, 236b) to the central side ribs (236e, 236f), the second two flexible couplers (250) coupled to substantially radially symmetrical positions on the first side ribs (236a, 236b) and the central side ribs (236e, 236f) about the central flow axis (299).

Preferably, the first two of the four flexible couplers (250) are substantially coplanar with one another in a first plane, the second two of the four flexible couplers (250) are substantially coplanar with one another in a second plane, wherein the first plane and the second plane are perpendicular to one another.

Preferably, the balance bar (230) has at least one plane of symmetry, the plane of symmetry being one or more of a plane defined by a cross axis (2) and a vertical axis (3) at a position at the center of the balance bar (230) in a flow axis (1), a plane defined by the flow axis (1) and the cross axis (2) at a position at the center of the balance bar (230) in the vertical axis (3), and a plane defined by the flow axis (1) and the vertical axis (3) at a position of the center of the balance bar (230) in the cross axis (2).

Preferably, the balance bar (230) is one or more of radially symmetrical and axially symmetrical about one or more of a central flow axis (299), the central portion (233), and the first side portion (231).

Preferably, one of the two or more first side ribs (236a) and one of the two or more central side ribs (236e) are coupled by one of the at least one flexible coupler (250), wherein there is a gap (298) between the one of the two or more first side ribs (236a) and the one of the two or more central side ribs (236e).

Preferably, one or more of the at least one flexible coupler (250) is coupled to one or more of the at least one support (260).

According to an aspect, a method of making a balance bar (230) is disclosed. The method comprises forming the balance bar (230), the balance bar (230) comprising a first side portion (231) having a hollow interior for receiving a flow tube (220), a central portion (233) having a hollow interior for receiving a flow tube (220), a first side flexible portion (234) comprising at least one flexible coupler (250), the first side flexible portion (234) coupling the first side portion (231) with the central portion (233), wherein the first side portion (231) and the central portion (233) are both more rigid than the first side flexible portion (234).

BRIEF DESCRIPTION OF THE DRAWINGS

The same reference number represents the same element on all drawings. It should be understood that the drawings are not necessarily to scale.

FIG. 1 shows a prior art internal assembly 100 of a prior art flow sensor.

DETAILED DESCRIPTION

Figure 2:
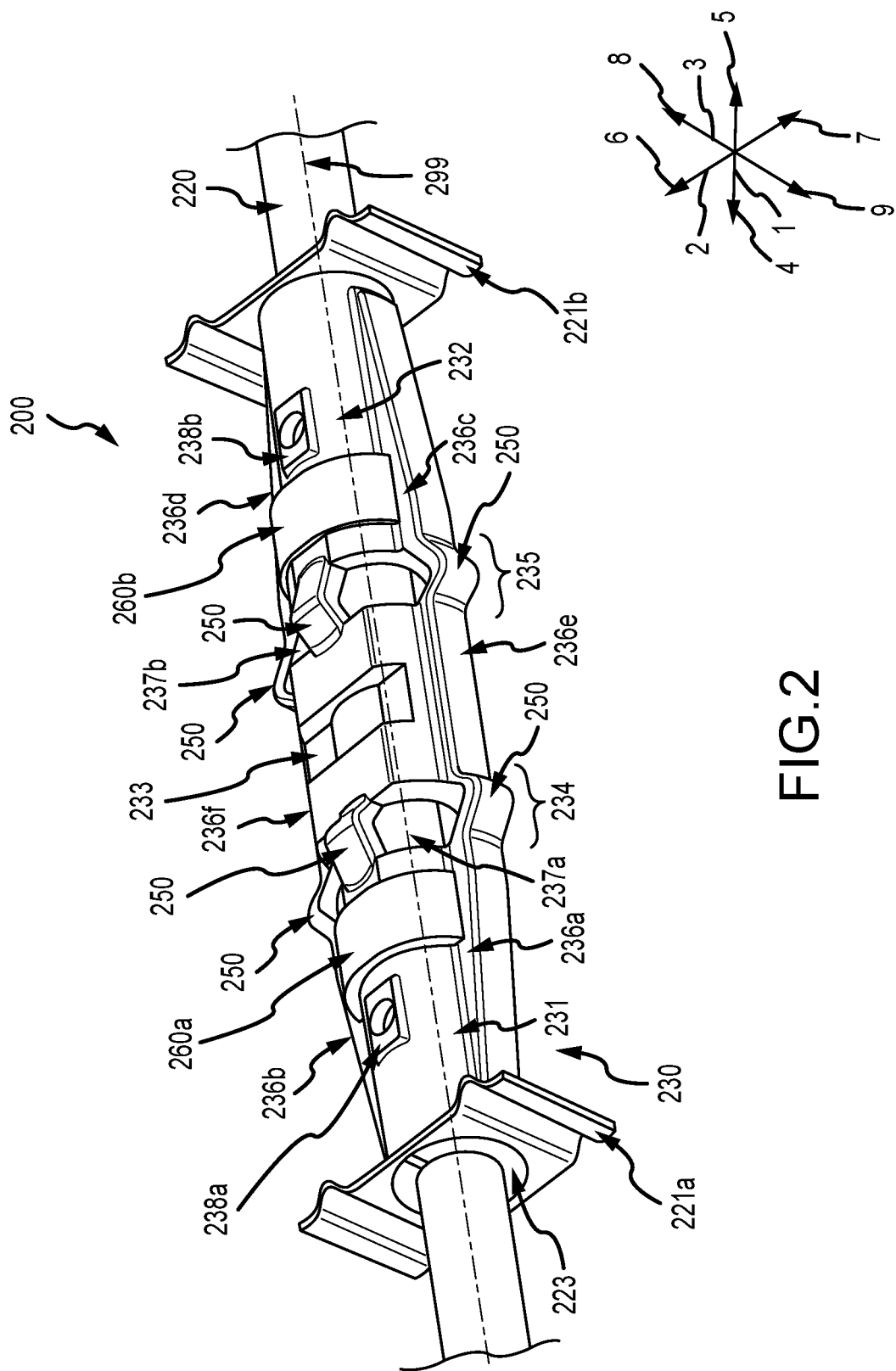
FIG. 2 shows a perspective view of a flow sensor internal assembly 200.

FIGS. 1-9 and the following description depict specific examples to teach those skilled in the art how to make and use the best mode of embodiments of flexible sensor elements. For the purpose of teaching inventive principles, some conventional aspects have been simplified or omitted. Those skilled in the art will appreciate variations of these examples that fall within the scope of the present description. Those skilled in the art will appreciate that the features described below can be combined in various ways to form multiple variations of flexible sensor elements. As a result, the embodiments described below are not limited to the specific examples described below, but only by the claims and their equivalents.

Traditional Coriolis sensors have rigid balance bars that are formed of a piece with continuous longitudinal ribs that cannot accommodate stresses induced by temperature differences. For instance, FIG. 1 shows a prior art internal assembly 100 of a prior art flow sensor. The prior art internal assembly 100 has a flow tube 103, connect links 104a and 104b, a brace bar 105 (and corresponding brace bar 105 for the other side not shown), and a balance bar 106.

The flow sensor is a sensor that detects properties of fluids flowing therethrough. The flow tube 103 is a conduit through which fluid is flowed. In Coriolis sensors, the flow tube 103 is vibrated during fluid flow with the resulting vibrational responses used to measure fluid flow and/or flow fluid properties, for instance mass flowrate and/or density. The manners in which these measurements are conducted are well-established in the art and are omitted for brevity. The connect links 104a and 104b are connectors for coupling the prior art internal assembly 100 to a case (not shown). The brace bar 105 is an element that limits the vibrational length of the flow tube 103 by rigidly coupling to the flow tube 103. The brace bar 105 may be coupled to the flow tube 103 and the connect link 104a (a corresponding brace bar 105 that cannot be seen in this perspective view may similarly couple another connect link 104b to the flow tube 103). Reference axes shown include a flow axis 1, a cross axis 2, and a vertical axis 3. The flow axis 1 may have a first side 4 and a second side 5. The cross axis 2 may have a left side 6 and a right side 7. The vertical axis 3 may have a top 8 and a bottom 9.

The prior art balance bar 106 is an element that increases the balance of the flow tube 103 to provide better balanced vibrational motion of the flow tube 103. The prior art balance bar 106 has a first side portion 107, a second side portion 108, a central portion 109, side ribs 110a and 110b, spaces 111a and 111b, sensor mounts 112a and 112b, and a driver mount 115. The central portion 109 is a portion that circumferentially surrounds the flow tube 103 at a central position in the flow axis 1. The central portion 109 may have a driver mount 115 for mounting a driver that drives vibrations in the flow tube 103 substantially in the vertical axis 3. The first side portion 107 and the second side portion 108 are elements of the prior art balance bar 106 that circumferentially surround the flow tube 103 in positions distal from the central portion 109 in the flow axis 1. The first side portion 107 and the second side portion 108 may have sensor mounts 112a and 112b, respectively. The sensor mounts 112a and 112b are coupling elements used to mount sensors, for instance, pickoff assemblies, that sense vibrational responses to the vibrations driven by the driver. The sensor readings may be used to determine flow characteristics such as mass flowrate, density, viscosity, volumetric flowrate, and/or the like in manners established in the art. Side ribs 110a and 110b are protrusions that add a larger balance cross-sectional area to provide better balance for the flow tube 103 vibrations. Further side ribs 110a and 110b may provide greater and/or different stiffness to the balance bar 106, thus defining unique stiffness in a plane orthogonal to a driving plane. This may separate the mode shapes in frequency, thereby providing a defined drive plane for a tubular section that would otherwise have no clearly preferred driving plane. Side ribs 110a and 110b are located on the sides of the flow tube 103 in the cross axis 2. Side ribs 110a and 110b typically reside substantially in a plane defined by the flow axis 1 and cross axis 2. This arrangement provides balance to limit or substantially eliminate vibrational motion in axes other than the vertical axis 3. Spaces 111a and 111b are portions between each of the side portions 107 and 108 and the central portion 109 where the flow tube 103 is not surrounded circumferentially by elements, only having the side ribs 110a and 110b on opposing sides of the flow tube 103 at the spaces 111a and 111b.

The prior art balance bar 106 provides some flexibility by providing the spaces 111a and 111b between each of the side portions 107 and 108 and the central portion 109. This reduces rigidity and allows lower frequency drive excitations to be used in flow measurements than if the spaces 111a and 111b were not provided. The side ribs 110a and 110b are still continuous about the flow tube 103 along the flow axis 1. This provides greater balance to limit motions in axes other than the vertical axis 3. While there are benefits to the prior art internal assembly 100, the continuous side ribs 110a and 110b make the prior art internal assembly 100 more rigid. This rigidity causes greater stress on the flow tube 103 and the couplings to the flow tube 103 when there is a difference in temperature between the elements in the prior art internal assembly 100 and both of the flow tube 103 and the couplings that couple flow tube 103 to other elements in the prior art internal assembly 100. The prior art design does not provide flexibility in the flow axis 1 to allow the flow tube 103 to expand and/or contract, especially in the axial direction.

FIG. 2 shows a perspective view of a flow sensor internal assembly 200. The internal assembly 200 has a flow tube 220, connect links 221a and 221b, a brace bar 223 (and corresponding brace bar 223 for the other side not shown), and a balance bar 230. It should be appreciated that different configurations of vibratory sensors are considered, for instance, curved tube flow sensors, fork meters, and/or the like.

The internal assembly 200 is an internal assembly of elements of a flow sensor. The flow tube 220 is a conduit through which fluid is flowed. The assembly 200 has a central flow axis 299 that may be illustrated as being centrally located. In Coriolis sensors, the flow tube 220 is vibrated during fluid flow with the resulting vibrational responses used to measure fluid flow and/or flow fluid properties, for instance mass flowrate and/or density. The manners in which these measurements are conducted are well-established in the art and are omitted for brevity. The connect links 221a and 221b are connectors for coupling the internal assembly 200 to a case (not shown). The brace bar 223 is an element that limits the vibrational length of the flow tube 220 by rigidly coupling to the flow tube 220. The brace bar 223 may be coupled to the flow tube 220 and the connect links 221a and 221b (as may be a corresponding brace bar 223 that cannot be seen in this perspective view). Reference axes shown include the flow axis 1, the cross axis 2, and the vertical axis 3. For purposes of this specification, in various embodiments, the distal and proximal directions may be relative to one or more of a central position of the internal assembly 200 in the flow axis 1, a central position of flow tube 220 in the flow axis 1, and/or a central plane in the flow axis 1.

The balance bar 230 is an element that increases the balance of the flow tube 220 to provide better balanced vibrational motion of the flow tube 220. The balance bar 230 has a first side portion 231, a second side portion 232, a central portion 233, a first side flexible portion 234, a second side flexible portion 235, side ribs 236, spaces 237a and 237b, sensor mounts 238a and 238b, flexible couplers 250, and supports 260. The central portion 233 is a portion that circumferentially surrounds the flow tube 220 at a central position of the balance bar 230 in the flow axis 1. The central portion 233 may have a driver mount (not shown) for mounting a driver that drives vibrations in the flow tube 220 substantially in the vertical axis 3. The first side portion 231 and the second side portion 232 are elements of the balance bar 230 that circumferentially surround the flow tube 220 in positions distal from the central portion 233 in the flow axis 1. To this end, the first side portion 231 and second side portion 232 may be referred to, generically, as "distal portions." The first side portion 231 and the second side portion 232 may have sensor mounts 238a and 238b, respectively. The sensor mounts 238a and 238b are coupling elements used to mount sensors, for instance, pickoff assemblies. Side ribs 236 are protrusions that add a larger cross-sectional area to provide better balance for the flow tube 220 vibrations. Side ribs 236 are located on the sides of the flow tube 220 in the cross axis 2. Side ribs 236 may reside substantially in a plane defined by the flow axis 1 and cross axis 2. This arrangement provides balance to limit or substantially eliminate vibrational motion in axes other than the vertical axis 3. Spaces 237a and 237b are empty portions between each of the side portions 231 and 232 and the central portion 233 where the flow tube 220 is not surrounded circumferentially by elements, only having flexible elements of the flexible portions 234 and 235 about or on opposing sides of the flow tube 220 at the spaces 237a and 237b.

The flexible portions 234 and 235 are flexible portions of the balance bar 230 that allow the flow tube 220 to expand and contract with changes in temperature. The first side portion 231, the second side portion 232, the central portion 233, and the side ribs 236 may be substantially rigid. The flexible portions 234 and 235 may provide flexibility in the balance bar 230 to allow the flow tube 220 to expand more axially in the flow axis 1 than the substantially rigid elements would allow.

For purposes of explanation, the side ribs 236 may be further classified as first side ribs 236a and 236b, central side ribs 236e and 236f, and second side ribs 236c and 236d. The first side ribs 236a and 236b are coupled to the first side portion 231 to balance vibrations in the first side portion 231. The central side ribs 236e and 236f are coupled to the central portion 233 to balance vibrations in the central portion 233. The second side ribs 236c and 236d are coupled to the second side portion 232 to balance vibrations in the second side portion 232. The first side ribs 236a and 236b and the second side ribs 236c and 236d may collectively be referred to as "distal side ribs" 236. It should be appreciated that the first side ribs 236a and 236b, the central side ribs 236e and 236f, and the second side ribs 236c and 236d may be of different shapes, perhaps as depicted in the figures. One or more of the first side ribs 236a and 236b, the central side ribs 236e and 236f, and the second side ribs 236c and 236d may be coupled to be radially and/or axially symmetrical about the central flow axis 299. Also, the first side ribs 236a and 236b, the central side ribs 236e and 236f, and the second side ribs 236c and 236d may be symmetrical about a plane defined by the vertical and cross axes 3 and 2, the plane located at a central point of the internal assembly 200 in the flow axis 1 (hereinafter, "central plane in the flow axis 1"). In an embodiment, when assembled with the internal assembly 200, the side ribs 236 may have one or more gaps 298 between each other along the flow axis 1 in a plane defined by the flow and cross axes 1 and 2. In an embodiment, when assembled with the internal assembly 200, the side ribs 236 may have one or more gaps 298 between each other along the flow axis 1 in a plane defined by the flow and vertical axes 1 and 2. In an embodiment, these gaps 298 may be in the same position and/or of the same length along the flow axis 1 as one or more of the spaces 237a and 237b. Side ribs 236 on each side portion may have supports 260 that couple the side ribs 236 on each side of the internal assembly 200. The supports 260 may additionally or alternatively be features that add mass. For instance, in an embodiment, the supports 260 may not provide support at all but merely contribute more mass at relevant geometric positions. In various embodiments, each of the supports 260 may be one piece that circumferentially surrounds the flow tube 220 or may be two segments, each of which couples two side ribs 236, one on the top 8 and the other on the bottom 9. In an embodiment, when the support is composed of two elements, the two elements may not be directly connected but connected to top 8 and bottom 9 portions of the side ribs 236 the support 260 couples.

Figure 5:
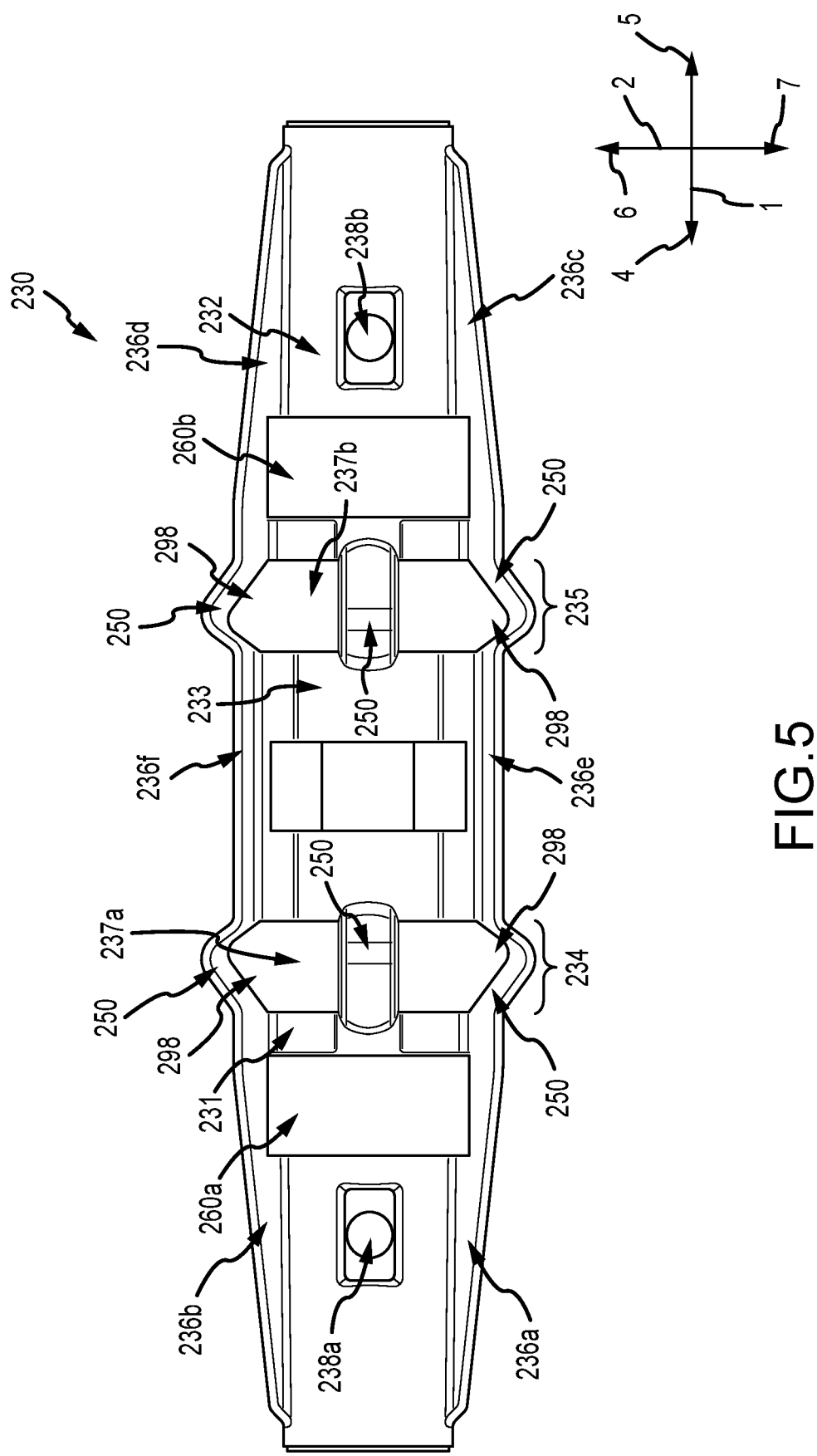
FIG. 5 shows a top view of an embodiment of a balance bar 230.

For instance, on the first side 4, the first side ribs 236a and 236b may be coupled to one another via a first side support 260a. The first side support 260a may also be coupled to or integral with the first side portion 231. Additionally, or alternatively, on the second side 5, the second side ribs 236c and 236d may be coupled to one another via a second side support 260b. The second side support 260b may also be coupled to or integral with the second side portion 232. In an embodiment, a support 260 may be symmetrical about a plane in which the side ribs 236 the support 260 couples reside. Further, for flexible couplers 250 that couple the first side portion 231 or the second side portion 232 to the central portion 233, the flexible couplers 250 may be further directly or indirectly coupled to the corresponding first side support 260a or second side support 260b, respectively. In another embodiment, flexible couplers 250 that effectively couple the first side portion 231 or the second side portion 232 to the central portion 233 may be directly coupled to the supports 260 without any intermediate coupling to the first side portion 231 or second side portion 232, respectively. Given the shown arrangement of the first side ribs 236a and 236b, second side ribs 236c and 236d, and central side ribs 236e and 236f, there may be gaps 298 between the side ribs 236, for instance, there may be gaps 298 between each of the first side ribs 236a and 236b and each of the corresponding central side ribs 236e and 236f or there may be gaps 298 between each of the second side ribs 236c and 236d and each of the corresponding central side ribs 236e and 236f. For instance, as shown in FIG. 5, there is a gap 298 between each of the first side rib 236a and central side rib 236e, the first side rib 236b and central side rib 236f, the central side rib 236e and the second side rib 236c, and the central side rib 236f and the second side rib 236d. Any of the embodiments shown in any of the figures may have gaps 298, too, but the gaps 298 are easiest to distinguish in the top views of FIGS. 3 and 5 where the gaps 298 are shown.

The first side flexible portion 234 is a flexible portion of the balance bar 230 that couples rigid portions on a first side 4 to the central portion 233 or elements coupled to the central portion 233. For instance, these first side 4 couplings may include a flexible coupling between at least one first side rib 236a and/or 236b and at least one central side rib 236e and/or 236f. The first side 4 couplings may additionally or alternatively include a flexible coupling between the first side portion 231 and the central portion 233. Flexible couplings may comprise flexible couplers 250, coupling elements that can flex to allow for tube expansion and/or contraction. Because the flow sensor should retain proper balance and alignment during use, the flexible couplers 250 may be arranged such that they provide radially and/or axially symmetrical couplings about the flow tube 220 in the flow axis 1. The couplings may also be arranged such that the internal assembly 200 is symmetrical about a central plane in the flow axis 1. Any number of couplings and any number of flexible couplers 250 may be used. For instance, 1, 2, 3, 4, 5, 6, 7, 8, 9, 10, or 11 flexible couplers 250 and/or flexible couplings may be used on the first side 4 of the internal assembly 200.

The second side flexible portion 235 is a flexible portion of the balance bar 230 that couples rigid portions on a second side 5 to the central portion 233 or elements coupled to the central portion 233. For instance, these second side 5 couplings may include a flexible coupling between at least one second side rib 236c and/or 236d and at least one central side rib 236e and/or 236f. The second side 5 couplings may additionally or alternatively include a flexible coupling between the second side portion 232 and the central portion 233.

Flexible couplings may comprise flexible couplers 250, coupling elements that can flex to allow for tube expansion. Because the flow sensor should retain proper balance and alignment during use, the flexible couplers 250 may be arranged such that they provide radially and/or axially symmetrical couplings about the flow tube 220 in the flow axis 1. The couplings may also be arranged such that the internal assembly 200 is symmetrical about a central plane in the flow axis 1.

Figure 3:
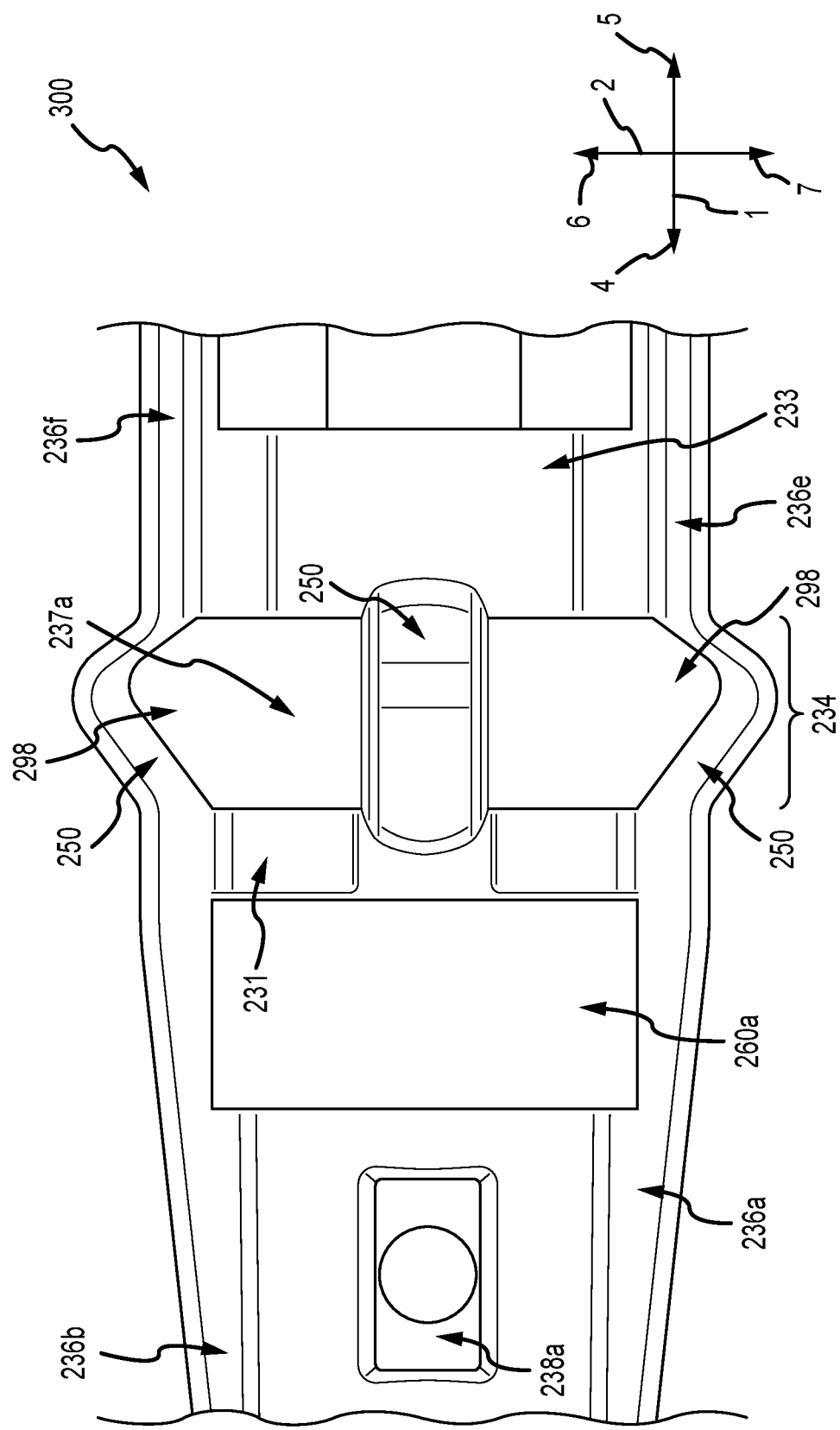
FIG. 3 shows a top view of an embodiment of a portion 300 of the internal assembly 200 with a flexible coupling.

Any number of couplings and any number of flexible couplers 250 may be used. For instance, 1, 2, 3, 4, 5, 6, 7, 8, 9, 10, 11, 12, 13, 14, 15, 16, 17, 18, 19, 20, and/or the like flexible couplers 250 or flexible couplings may be used to couple rigid portions of the internal assembly 200. While the flexible portions 234 and 235 are flexible overall, they may comprise sub-elements that are rigid, for instance rigid links or rigid couplings to rigid elements. An embodiment of a flexible coupling is shown in FIG. 3. It should be appreciated that any of the balance bar 230 elements or components may be composed of any suitable meter materials, such as C22, tantalum, titanium, zirconium, and/or stainless steel.

Symmetry of the balance bar 230 may be preserved in any number of planes, axes, and or radii. For instance, the balance bar 230 may be symmetrical in that it is one or more of radially and/or axially symmetrical about a central flow axis 299 (perhaps, a longitudinal central line in a flow axis 1 that represents where the central axis of a flow tube 220 along its length would be as shown in FIG. 2), radially and/or axially symmetrical about the central portion 233, radially and/or axially symmetrical about the first side portion 231, and radially and/or axially symmetrical about the second side portion 232. The balance bar 230 may have planes of symmetry, for instance, the balance bar 230 may be symmetrical about one or more of a plane defined by the central plane in the flow axis 1 (already previously defined), a plane defined by the flow axis 1 and the cross axis 2 at a position at the center of the balance bar 230 in the vertical axis 3, and/or a plane defined by the flow axis 1 and the vertical axis 3 at a position of the center of the balance bar 230 in the cross axis 2. These symmetries may also make certain elements substantially coplanar. That is, some side ribs 236 and/or some of the flexible couplers 250 may be substantially situated in the same plane. For instance, all of at least two of the first side ribs 236a and 236b, at least two of the two or more central side ribs 236e and 236f, and at least two of the two or more second side ribs 236c and 236d may be substantially coplanar. In another embodiment, all of two or more flexible couplers 250 on the first side 4 and two or more flexible couplers 250 on the second side 5 are substantially coplanar. In another embodiment, a first two of four flexible couplers 250 are substantially coplanar with one another in a first plane, and the second two of the four flexible couplers 250 are substantially coplanar with one another in a second plane, wherein the first plane and the second plane are perpendicular to one another.

FIG. 3 shows a top view of an embodiment of a portion 300 of the internal assembly 200 with a flexible coupling. For purposes of brevity, FIG. 3 shows only an embodiment of a flexible coupling on the first side 4, but the embodiments presented can reflect relationships between the central portion 233 and one or more distal portions (e.g. the first side portion 231 and/or the second side portion 232) and distal side ribs (e.g. first side ribs 236a and 236b and/or second side ribs 236c and 236d). It can be appreciated that flexible couplings on the second side 5 may be analogous to and/or symmetrical about a central plane in the flow axis 1 with the first side 4 elements shown in FIG. 3. The flexible coupling may be described using internal assembly 200, flow tube 220, a first side portion 231, a central portion 233, a first side flexible portion 234, first side ribs 236a and 236b, central side ribs 236e and 236f, space 237a, and flexible couplers 250. It should be appreciated that the internal assembly 200, flow tube 220, the first side portion 231, the central portion 233, the first side flexible portion 234, first side ribs 236a and 236b, the central side ribs 236e and 236f, the support 260 and the space 237a may be embodiments of the internal assembly 200, the flow tube 220, the first side portion 231, the central portion 233, the first side flexible portion 234, the first side ribs 236a and 236b, the central side ribs 236e and 236f, the support 260, and the space 237a of FIG. 2.

The first side flexible portion 234 may be defined by the 3-dimensional region about the flow tube 220 at positions on the flow axis 1 between the first side portion 231 and the central portion 233. The space 237a and the flexible couplers 250 may be at least partially located in and at least partially define the first side flexible portion 234. The first side flexible portion 234 may have the flexible coupling. The flexible coupling may couple elements on the first side 4 and elements in a central position of the flow axis 1. For instance, the flexible coupling may couple the first side portion 231 to the central portion 233. Additionally, or alternatively, the flexible coupling may couple at least one first side rib 236a and/or 236b with at least one central side rib 236e and/or 236f. The flexible coupling may comprise one or more flexible couplers 250.

Balance assemblies that have the flexible portions may reduce stresses on the flow tube 220 due to temperature differences by allowing greater axial freedom of expansion and/or contraction.

Figure 4:
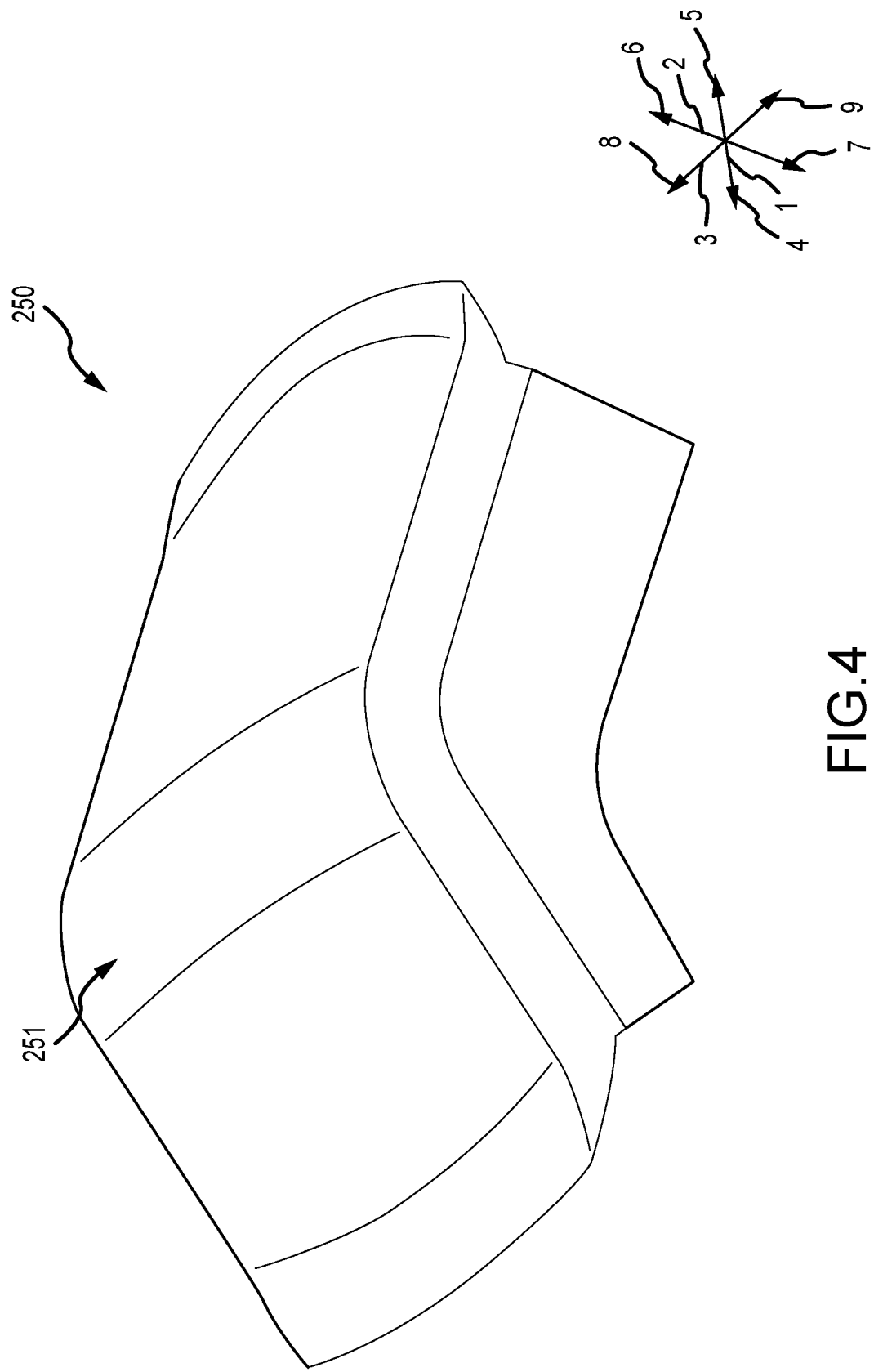
FIG. 4 shows a perspective view of a flexible coupler 250.

FIG. 4 shows a perspective view of a flexible coupler 250. The flexible coupler 250 may be of any shape, size and confirmation that provides flexibility for flow tube 220 expansion. In an embodiment, the flexible coupler 250 may be in the shape of a bow. In an embodiment, the flexible coupler 250 may be in the shape of an arch. In an embodiment, the flexible coupler 250 may be in the shape of one or more sharp corners, for instance, like a bifurcated polygon. These shapes are exemplary, and other shapes of flexible coupler 250 are contemplated.

The flexible coupler 250 may have an apex 251, a peak that represents one of the radially furthest point or the radially closest point of the flexible coupler 250 with respect to the flow tube 220 when the internal assembly 200 is assembled. The apex 251 may be in a central position of the flexible coupler 250 along the flexible coupler's 250 length in the flow axis 1. Alternatively, the apex 251 may be closer to one side than another of the flexible coupler 250 along the length of the flexible coupler 250 in the flow axis 1, perhaps making a skewed flexible coupler 250. Even if the apex 251 is centrally located along the length of the flexible coupler 250 in the flow axis, the weight and/or the thickness of the flexible coupler 250 may be distributed differently along the longitudinal length of the flexible coupler 250 and/or along the length of the flexible coupler 250 in the flow axis 1, perhaps still making a skewed flexible coupler 250. In another embodiment, the flexible coupler 250 may be symmetrical about a plane defined by the cross and vertical axes 2 and 3 at the point of the apex 251, such that the flexible coupler 250 is not skewed, but is a symmetrical coupler.

As shown, the apex 251 is the radially furthest portion of the flexible coupler 250 relative to the flow tube 220. In an embodiment, the flexible coupler 250 may have an apex 251 that is closer to the central portion 233 than the first side portion 231 along a length of the flexible coupler 250 in the flow axis 1. In an embodiment, the flexible coupler 250 may have an apex 251 that is closer to the first side portion 231 than the central portion 233 along a length of the flexible coupler 250 in the flow axis 1. In an embodiment, the flexible coupler 250 may have an apex 251 that is closer to the central portion 233 than the second side portion 232 along a length of the flexible coupler 250 in the flow axis 1. In an embodiment, the flexible coupler 250 may have an apex 251 that is closer to the second side portion 232 than the central portion 233 along a length of the flexible coupler 250 in the flow axis 1. In an embodiment, the flexible coupler 250 may have an apex 251 that is distal of a central position of the flexible coupler 250 along its length in the flow axis 1. In an embodiment, the flexible coupler 250 may have an apex 251 that is one of proximal or distal of a central position of the flexible coupler 250 along its length in the flow axis 1 These embodiments may also represent a flexible coupler 250 with asymmetric weight (and/or amount of material) distribution of the flexible coupler 250 along its own length in the flow axis 1. For instance, the flexible coupler 250 may have more of its weight (and/or material) distributed on one of a distal side or a proximal side of a central position of the flexible coupler 250 in the flow axis 1. In an embodiment, the flexible coupler 250 may have a greater thickness on one side of a flexible coupler 250 apex 251 than the other side. The thickness may be characterized by a thickness of a cross-section of the flexible coupler 250 as along one of the length of the flexible coupler 250 in the flow axis 1 and the longitudinal length of the flexible coupler 250. In an embodiment, the thickness of the flexible coupler 250 (as defined in the prior sentence) may be greater on one of a proximal side and a distal side of the flexible coupler 250 than on the other of the proximal side and distal side of the flexible coupler 250.

In an embodiment, the flexible coupler 250 may have multiple apexes 251, for instance, alternating inward and outward apexes 251 (inward and outward with respect to one or more of the flow tube 220 and the side ribs 236) that alternate along one or more of a flow axis 1, cross axis 2, and vertical axis 3. In an embodiment, the flexible couplers 250 may be curvilinear, having alternating outward facing and inward facing apexes 251. In still another embodiment, the balance bar 230 may have more than one flexible coupler 250 that couple the same side ribs 236 at the same longitudinal position in the flow axis 1. For instance, in this embodiment, the flexible couplers 250 may have apexes 251 that oppose one another in at least one axis. In yet another embodiment, the balance bar 230 may have more than one flexible coupler 250 that each couple the same side ribs 236 at the same longitudinal position in the flow axis 1 with the flexible couplers 250 having apexes 251 parallel to one another in at least one axis. Balance bars 230 with combinations of the aforementioned embodiments are contemplated as well.

In different embodiments, the shape of the flexible coupler 250 at the apex 251 may be a corner. In another embodiment, the shape of the flexible coupler 250 at the apex 251 may be a curve. In another embodiment, the shape of the flexible coupler 250 may be like a bifurcated polygon, such that the shape of the flexible coupler 250 has corners and such that the apex 251 may have the shape of a corner or may have a shape of a line segment that is one or more of parallel with or curved with respect to the flow axis 1.

In various embodiments, these asymmetries in the flexible coupler 250 may be balanced from one side of the balance bar 230 to another. That is that the flexible coupler 250 may not, itself, be symmetrical along its longitudinal length and/or its length in the flow axis 1, but it may have a complementary flexible coupler 250 on an opposing side of the interior assembly 200 in the flow axis 1, such that the flexible coupler 250 and the complementary flexible coupler 250 are symmetrical about a central plane in the flow axis 1. Multiple flexible couplers 250 may be employed on each side of the central plane in the flow axis 1 and may be arranged to provide symmetry about the central plane in the flow axis 1.

In an embodiment the flexible couplers 250 may be integral parts of the side ribs 236, such that a flexible portion may be characterized as gaps 298 in what would otherwise be traditional, continuous side ribs, for instance, gaps 298 in side ribs 110a and 110b in the prior art FIG. 1. In other embodiments, the flexible couplers 250 may be elements separate of side ribs 236 and may be coupled to the side ribs 236.

When flexible couplers 250 are coupled to the internal assembly 200, the flexible couplers 250 may be substantially situated in (to the extent that two or more of the beginning, end, and apex 251 reside in) a plane defined by axes. For instance, one or more flexible couplers 250 may each be coupled to the internal assembly 200 to be substantially situated in planes defined by axes, for instance, planes defined by flow and vertical axes 1 and 3 and/or planes defined by cross and vertical axes 2 and 3. In another embodiment, the flexible couplers 250 may be of a thickness in a plane defined by the cross and vertical axes 2 and 3 that is one of greater than, less than, or the same (or substantially the same) as the same defined thickness of side ribs 236. In an embodiment, the flexible couplers 250 may be of the same (or of substantially the same) length in the flow axis 1 as the spaces 237a and 237b. A skewed flexible coupler 250 may also have different angles of straight portions of the flexible coupler 250 about an apex 251.

It can be seen that the shape of the flexible coupler 250 at the apex 251 shown is a curve on both its exterior and interior. As illustrated, the flexible coupler 250 has an apex 251 that is skewed towards an end of the flexible coupler 250 along the length of the flexible coupler 250 in the flow axis 1. This skewed position of the apex 251 can reflect a skewed distribution of the flexible coupler 250 relative to its length in the flow axis 1 with respect to one or more of weight, cross-section, thickness, and angle of straight portions relative to the flow tube 220, of the flexible coupler 250. As shown, the flexible coupler 250 may have one or more of a skewed weight, cross-section, thickness, and angles of straight portions relative to a central flow axis 299.

In an alternative embodiment, a flexible coupler 250 may have a shape of a corner (not shown). This embodiment can be construed as a bifurcated four-sided polygon. Embodiments are contemplated where there are more corners, such that the flexible coupler 250 has a shape of a polygon with more sides. Further embodiments are contemplated where the shape of the flexible coupler 250 is like a bisected polygon but having rounded or curved corners.

FIGS. 5-8 show views of different perspectives of embodiments of the balance bar 230. All elements referenced are embodiments of the elements with the same reference numbers in the descriptions of FIGS. 2-4.

FIG. 5 shows a top view of an embodiment of a balance bar 230.

Figure 6:
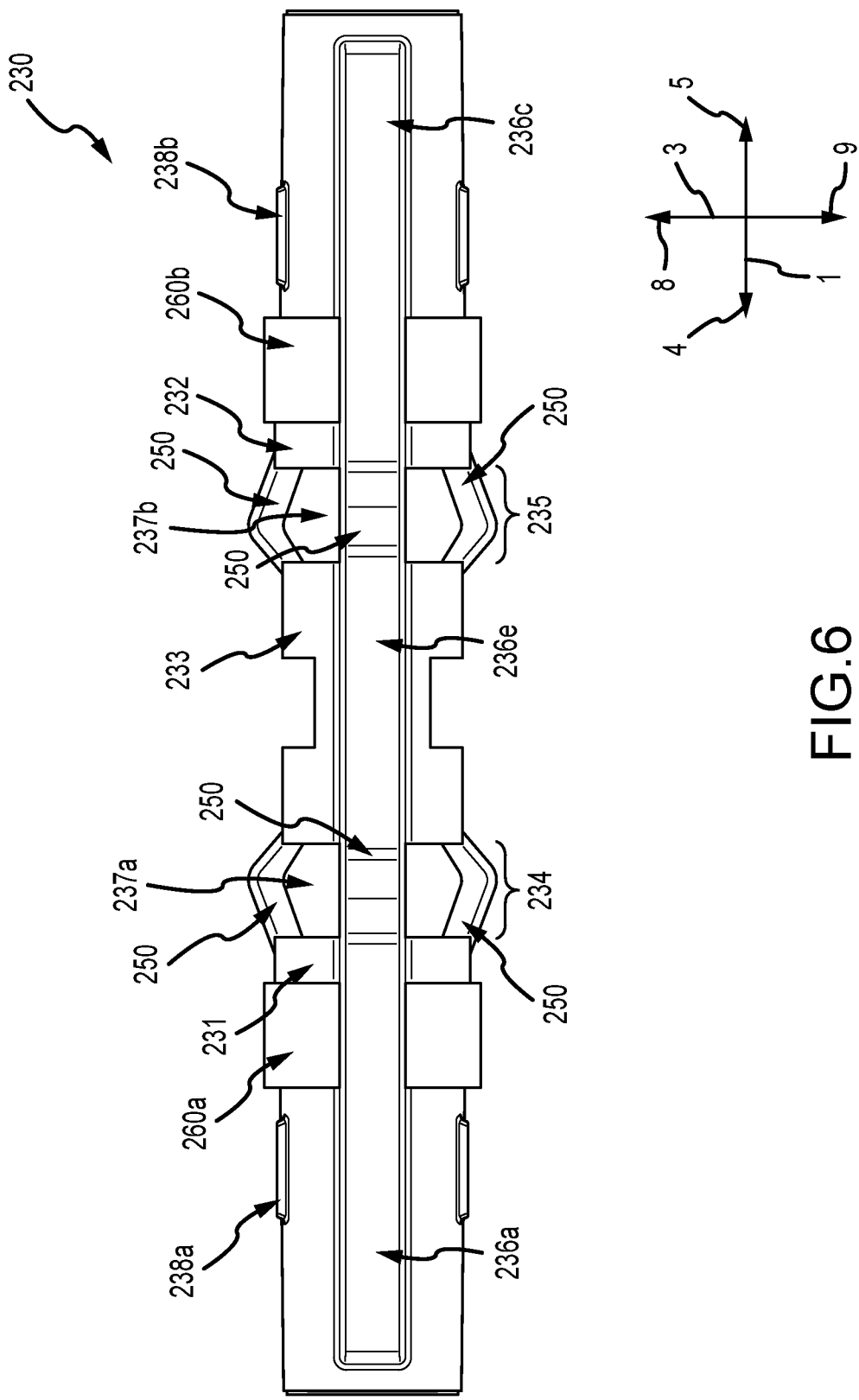
FIG. 6 shows a side view of an embodiment of a balance bar 230.

FIG. 6 shows a side view of an embodiment of a balance bar 230.

Figure 7:
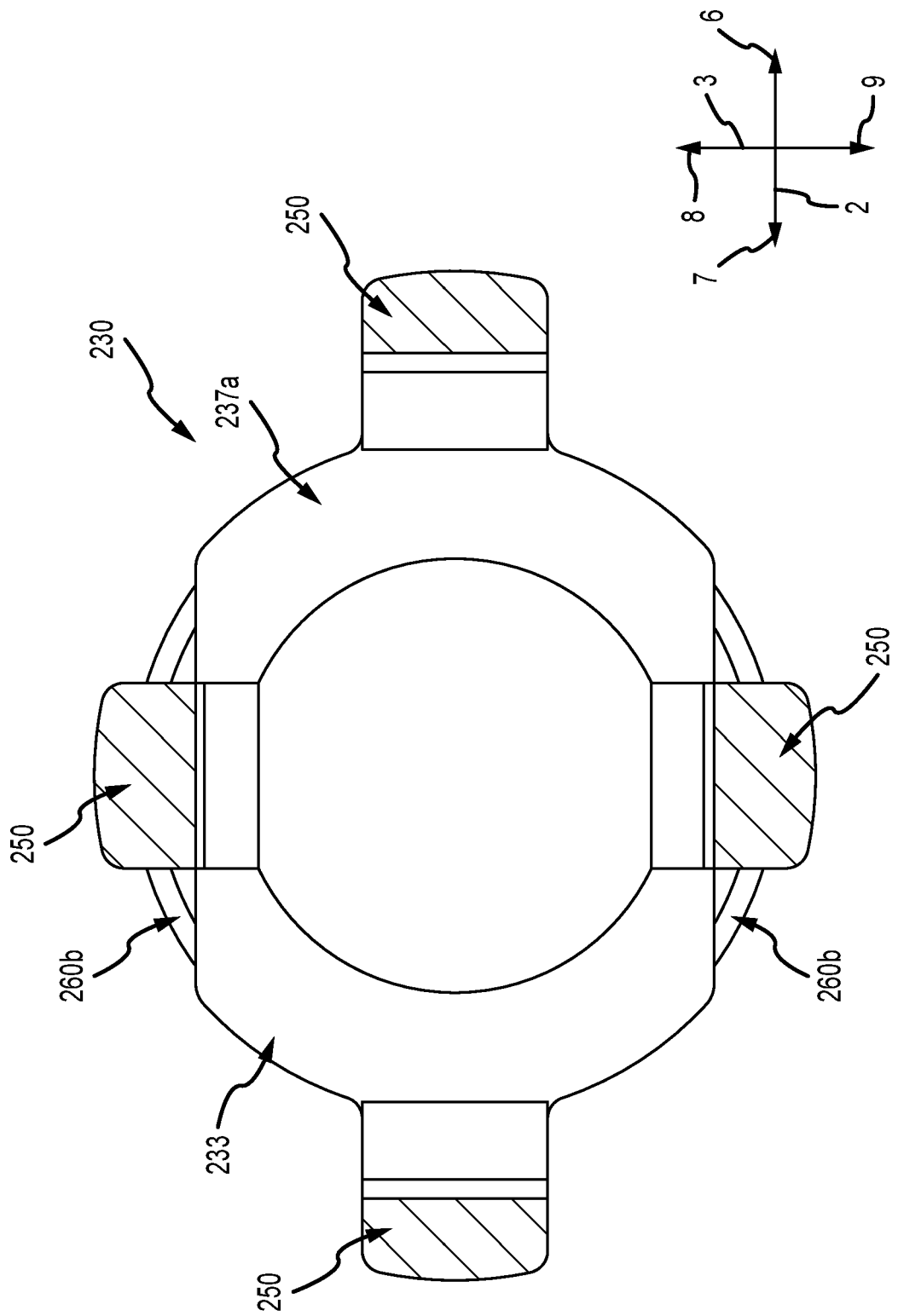
FIG. 7 shows a cross-sectional view of an embodiment of a balance bar 230.

FIG. 7 shows a cross-sectional view of an embodiment of a balance bar 230. The cross-sectional view may be from a longitudinal position at which the balance bar 230 has a space 237a between a first side portion 231 and a central portion 233, facing towards a second side 5 from a first side 4. The cross-section may be defined by the part of a balance bar 230 in a plane in the cross and vertical axes 2 and 3 at a longitudinal position along the flow axis 1 at which there is a space 237b.

Figure 8:
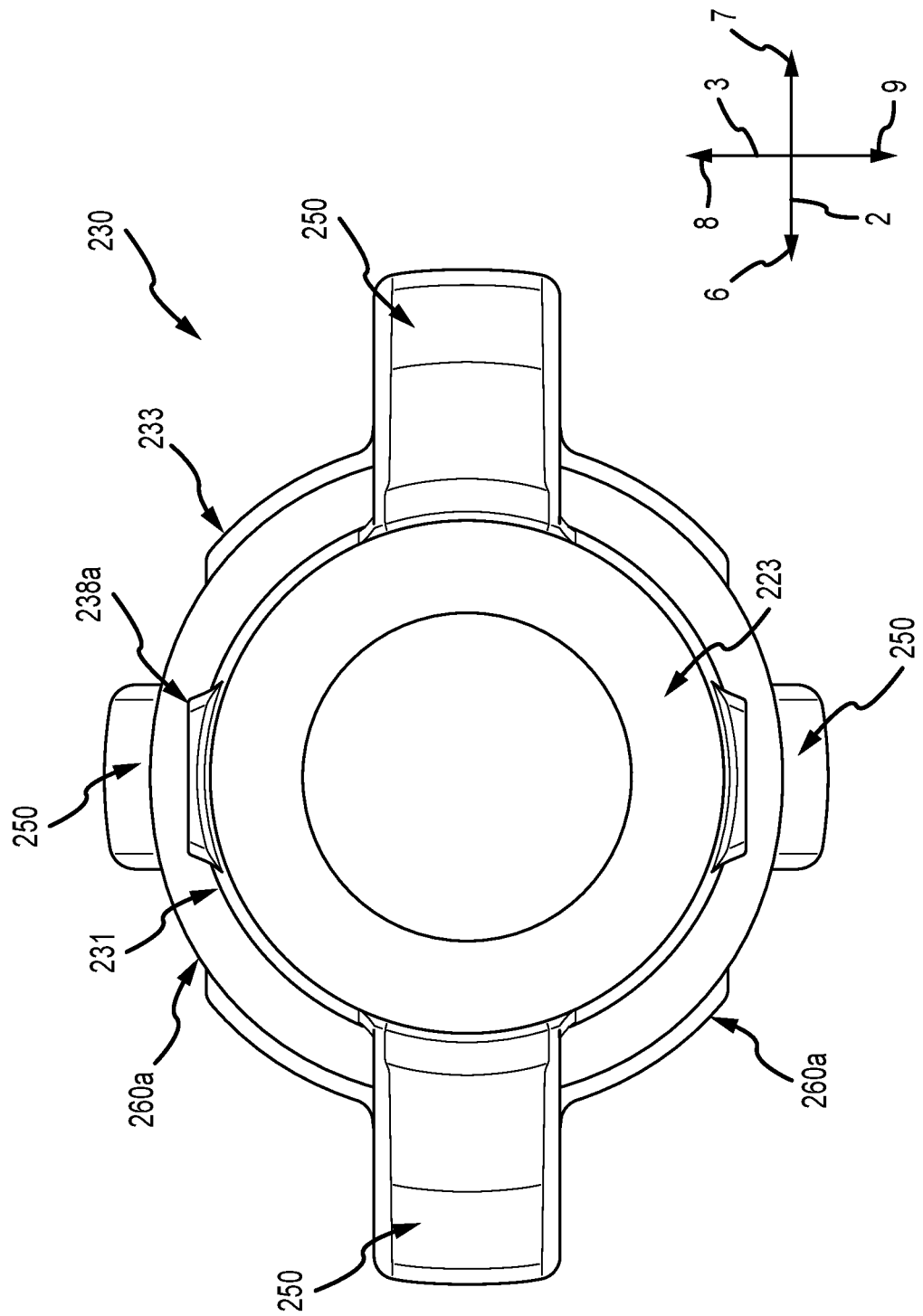
FIG. 8 shows a front view of an embodiment of a balance bar 230.

FIG. 8 shows a front view of an embodiment of a balance bar 230. The view may be from the perspective of a direction from the first side 4 to the second side 5 in a plane defined by the cross and vertical axes 2 and 3.

Figure 9:
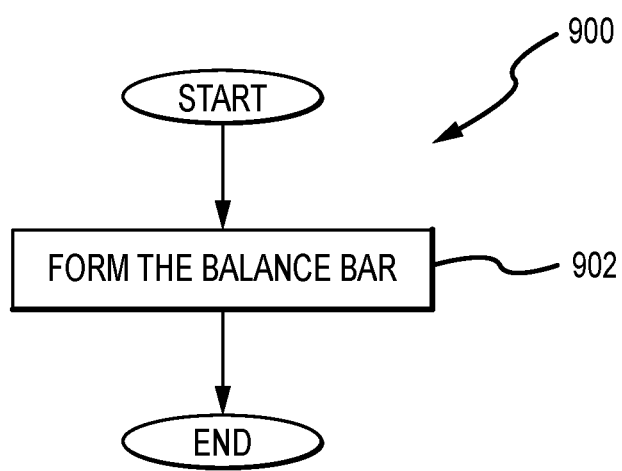
FIG. 9 shows a flowchart of an embodiment of a method 900 of making a balance bar 230.

FIG. 9 shows a flowchart of an embodiment of a method 900 of making a balance bar 230. The method steps of method 900 are presented with embodiments that include references to elements presented in other figures and the descriptions of the other figures. All capabilities, conformations, relative couplings, and positionings of these elements disclosed in the other figures and the descriptions of the other figures are contemplated for the purposes of executing these steps.

Step 902 is forming the balance bar 230. The balance bar 230 may be formed having features of any of the embodiments disclosed in this specification. The manners in which the components of the balance bar 230 are formed may include molding, casting, extruding, coupling sub-elements, 3D printing, and/or methods typically used to form balance bar 230 components known in the art. In an embodiment, the balance bar 230 is molded and formed as one piece without additional coupling of elements. In other embodiments, one or more of the first side portion 231, the second side portion 232, the central portion 233, the first side flexible portion 234, the second side flexible portion 235, the side ribs 236, the sensor mounts 238a and 238b, the flexible couplers 250, and the supports 260a and 260b may be formed separately and subsequently coupled to form an assembly that is to become the balance bar 230. In embodiments in which the elements are manufactured separately and subsequently coupled, any coupling method may be used, for instance, one or more of applying adhesives, pressure fit, complementary threading, welding, brazing, soldering, and/or any methods typically used to coupled components of balance bars 230 known in the art. The spaces 237a and 237b may be formed by forming, arrangement, and coupling of the other components. The balance bar 230 may be formed such that one or more of the symmetries and/or skewnesses specified in this specification may be achieved. In an embodiment, the flexible couplers 250 may be formed separately of the rest of the components of the balance bar 230, for instance, formed by 3D printing, and perhaps, subsequently coupled to the rest of the components of the balance bar 230 by brazing.

In other embodiments, the method shown in FIG. 9 may have other steps in addition to or instead of the step listed above. Subsets of the step listed above as part of the method shown in FIG. 9 may be used to form their own method. The step of method 900 may be repeated any number of times, for instance, continuously looping in order to form more balance bars 230.

The detailed descriptions of the above embodiments are not exhaustive descriptions of all embodiments contemplated by the inventors to be within the scope of the present description. Indeed, persons skilled in the art will recognize that certain elements of the above-described embodiments may variously be combined or eliminated to create further embodiments, and such further embodiments fall within the scope and teachings of the present description. It will also be apparent to those of ordinary skill in the art that the above-described embodiments may be combined in whole or in part to create additional embodiments within the scope and teachings of the present description. When specific numbers representing parameter values are specified, the ranges between any of those numbers as well as ranges above and ranges below those numbers are contemplated and disclosed.

Thus, although specific embodiments are described herein for illustrative purposes, various equivalent modifications are possible within the scope of the present description, as those skilled in the relevant art will recognize. The teachings provided herein can be applied to other embodiments of balance bars and not just to the embodiments described above and shown in the accompanying figures. Accordingly, the scope of the embodiments described above should be determined from the following claims.

We claim:

1. A balance bar (230), comprising:
    a first side portion (231) having a hollow interior for receiving a flow tube (220);
    a central portion (233) having a hollow interior for receiving the flow tube (220); and
    a first side flexible portion (234) comprising at least one flexible coupler (250), the first side flexible portion (234) directly coupling at least one of two or more first side ribs (236a, 236b) of the first side portion (231) with at least one of two or more central side ribs (236e, 236f) of the central portion (233);
    wherein the first side portion (231) and the central portion (233) are both more rigid than the first side flexible portion (234).

2. A balance bar (230) as claimed in claim 1,
    wherein the two or more first side ribs (236a, 236b) are coupled to an exterior of the first side portion (231); and
    wherein the two or more central side ribs (236e, 236f) are coupled to an exterior of the central portion (233).

3. A balance bar (230) as claimed in claim 2, wherein the at least one flexible coupler (250):
    couples the at least one of the two or more first side ribs (236a, 236b) to at least one of the two or more central side ribs (236e, 236f); and/or
    couples the at least part of the central portion (233) and at least part of the first side portion (231).

4. A balance bar (230) as claimed in claim 2, wherein one or more of:
    the first side portion (231) and the central portion (233) are coupled by one or more of the at least one flexible coupler (250); and
    wherein any of the two or more first side ribs (236a, 236b) and any of the two or more central side ribs (236e, 236f) are only coupled by one or more of the at least one flexible coupler (250).

5. A balance bar (230) as claimed in claim 2, further comprising at least one support (260), wherein one of the at least one support (260) at least partially couples one of the two or more first side ribs (236a, 236b) to another of the two or more first side ribs (236a, 236b).

6. A balance bar (230) as claimed in claim 5, wherein one or more of the at least one flexible coupler (250) is coupled to one or more of the at least one support (260).

7. A balance bar (230) as claimed in claim 2, further comprising:
- a second side portion (232) having a hollow interior for receiving a flow tube (220);
- a second side flexible portion (235) comprising another at least one flexible coupler (250), the second side flexible portion (235) directly coupling the second side portion (232) with the central portion (233); and
- two or more second side ribs (236c, 236d), wherein the two or more second side ribs (236c, 236d) are coupled to the exterior of the second side portion (232);
- wherein the second side portion (232) is more rigid than the first side flexible portion (234);
- wherein one or more of the another at least one flexible coupler (250):
  - couples at least one of the two or more second side ribs (236c, 236d) to at least one of the two or more central side ribs (236e, 236f); and/or
  - couples at least part of the central portion (233) and at least part of the second side portion (232);
- wherein:
  - the second side portion (232) and the central portion (233) are coupled by one or more of the another at least one flexible coupler (250); and/or
  - any of the two or more second side ribs (236c, 236d) and any of the two or more central side ribs (236e, 236f) are coupled by one or more of the another at least one flexible coupler (250).

8. A balance bar (230) as claimed in claim 2, wherein all of at least two of the two or more first side ribs (236a, 236b), at least two of the two or more central side ribs (236e, 236f), and at least two of the two or more second side ribs (236c, 236d) are substantially coplanar.

9. A balance bar (230) as claimed in claim 2, wherein all of two or more of the at least one flexible coupler (250) and two or more of the another at least one flexible coupler (250) are substantially coplanar.

10. A balance bar (230) as claimed in claim 2, wherein the at least one flexible coupler (250) comprises four flexible couplers (250), wherein a first two of the four flexible couplers (250) couple the first side portion (231) to the central portion (233), the first two of the four flexible couplers (250) coupled to substantially radially symmetrical positions on the first side portion (231) and the central portion (233) about a central flow axis (299), wherein a second two of the four flexible couplers (250) couple the first side ribs (236a, 236b) to the central side ribs (236e, 236f), the second two flexible couplers (250) coupled to substantially radially symmetrical positions on the first side ribs (236a, 236b) and the central side ribs (236e, 236f) about the central flow axis (299).

11. A balance bar (230) as claimed in claim 10, wherein the first two of the four flexible couplers (250) are substantially coplanar with one another in a first plane, the second two of the four flexible couplers (250) are substantially coplanar with one another in a second plane, wherein the first plane and the second plane are perpendicular to one another.

12. A balance bar (230) as claimed in claim 2, wherein one of the two or more first side ribs (236a) and one of the two or more central side ribs (236e) are coupled by one of the at least one flexible coupler (250), wherein there is a gap (298) between the one of the two or more first side ribs (236a) and the one of the two or more central side ribs (236e).

13. A balance bar (230) as claimed in claim 1, wherein at least one of the at least one flexible coupler (250) is arch shaped.

14. A balance bar (230) as claimed in claim 1, wherein at least one of the at least one flexible coupler (250) is skewed.

15. A balance bar (230) as claimed in claim 14, wherein the at least one flexible coupler (250) is skewed towards the central portion (233) relative to the first side portion (231) in one or more of weight, cross-section, and thickness of the at least one of the at least one flexible coupler (250).

16. A balance bar (230) as claimed in claim 1, wherein at least one of the at least one flexible coupler (250) is symmetrical.

17. A balance bar (230) as claimed in claim 1, wherein the at least one flexible coupler (250) has an apex (251).

18. A balance bar (230) as claimed in claim 1, wherein the balance bar (230) has at least one plane of symmetry, the plane of symmetry being one or more of:
- a plane defined by a cross axis (2) and a vertical axis (3) at a position at the center of the balance bar (230) in a flow axis (1);
- a plane defined by the flow axis (1) and the cross axis (2) at a position at the center of the balance bar (230) in the vertical axis (3);
- and a plane defined by the flow axis (1) and the vertical axis (3) at a position of the center of the balance bar (230) in the cross axis (2).

19. A balance bar (230) as claimed in claim 1, wherein the balance bar (230) is one or more of radially symmetrical and axially symmetrical about one or more of:
- a central flow axis (299);
- the central portion (233); and
- the first side portion (231).

20. A method of making a balance bar (230), comprising forming the balance bar (230), the balance bar (230) comprising:
- a first side portion (231) having a hollow interior for receiving a flow tube (220);
- a central portion (233) having a hollow interior for receiving the flow tube (220);
- a first side flexible portion (234) comprising at least one flexible coupler (250), the first side flexible portion (234) directly coupling at least one of the two or more first side ribs (236a, 236b) of the first side portion (231) with at least one of two or more central side ribs (236e, 236f) of the central portion (233);
- wherein the first side portion (231) and the central portion (233) are both more rigid than the first side flexible portion (234).

* * * * *